(12) United States Patent
Myers et al.

(10) Patent No.: US 8,254,498 B1
(45) Date of Patent: Aug. 28, 2012

(54) RANDOM ORTHOGONAL FREQUENCY DIVISION MULTIPLEXING

(75) Inventors: Theodore J. Myers, La Jolla, CA (US); Sourav Dey, San Diego, CA (US)

(73) Assignee: On-Ramp Wireless, Inc., San Diego, CA (US)

( * ) Notice: Subject to any disclaimer, the term of this patent is extended or adjusted under 35 U.S.C. 154(b) by 0 days.

(21) Appl. No.: 13/406,888

(22) Filed: Feb. 28, 2012

(51) Int. Cl.
*H04L 27/22* (2006.01)
*H04L 27/06* (2006.01)
*H04J 11/00* (2006.01)

(52) U.S. Cl. .......... 375/316; 375/340; 370/210

(58) Field of Classification Search .......... 375/260, 375/259, 316, 340; 370/208, 210
See application file for complete search history.

(56) References Cited

U.S. PATENT DOCUMENTS

| | | | |
|---|---|---|---|
| 7,362,812 B1 * | 4/2008 | Hou et al. | 375/260 |
| 2005/0089109 A1 * | 4/2005 | Yun et al. | 375/260 |
| 2005/0201268 A1 * | 9/2005 | Aoki et al. | 370/208 |
| 2007/0127329 A1 * | 6/2007 | Erben et al. | 369/44.26 |
| 2007/0133703 A1 * | 6/2007 | Kim et al. | 375/260 |
| 2009/0268852 A1 * | 10/2009 | Nishikawa | 375/340 |
| 2010/0091910 A1 * | 4/2010 | Mukai et al. | 375/340 |
| 2010/0118694 A1 * | 5/2010 | Shibata | 370/210 |

* cited by examiner

*Primary Examiner* — Tesfaldet Bocure
(74) *Attorney, Agent, or Firm* — Foley & Lardner LLP

(57) ABSTRACT

Methods, systems, and apparatuses, including computer programs encoded on computer-readable media, for receiving a first modulated signal on a first sub-channel, wherein a first transmitter randomly selects the first sub-channel from a plurality of sub-channels and for receiving, at the receiver, a second modulated signal on a second sub-channel, wherein the second sub-channel is orthogonal to the first sub-channel, wherein a second transmitter randomly selects the second sub-channel from the plurality of sub-channels. At least a portion of the first signal overlaps with a portion of the second signal. For each of the plurality of sub-channels, a plurality of symbols are stored in a buffer and a plurality of potential data frames are determined based upon the symbols in the buffer. A signal detection algorithm is applied to the potential data frames to detect the first modulated signal and the second modulated signal.

20 Claims, 6 Drawing Sheets

RANDOM ORTHOGONAL FREQUENCY DIVISION MULTIPLEXING

BACKGROUND

Orthogonal Frequency Division Modulation (OFDM) requires sub-carrier frequencies that are orthogonal to each other such that cross-talk between sub-channels is eliminated. While this greatly simplifies the design of the transmitter and receiver by eliminating the need for filters for each sub-channel, it requires a high degree of frequency synchronization.

OFDM can be extended to an Orthogonal Frequency Division Multiple Access (OFDMA) system by assigning different OFDM sub-channels to different users. However, the frequency synchronization requirement and communication requirements for the sub-channel assignment make the system less ideal for large numbers of users. An advantage of the system described below is that it has fewer communication requirements over previously described OFDMA systems.

SUMMARY

In general, one aspect of the subject matter described in this specification can be embodied in methods for receiving a first modulated signal on a first sub-channel, wherein a first transmitter randomly selects the first sub-channel from a plurality of sub-channels and for receiving, at the receiver, a second modulated signal on a second sub-channel, wherein the second sub-channel is orthogonal to the first sub-channel, wherein a second transmitter randomly selects the second sub-channel from the plurality of sub-channels. At least a portion of the first signal overlaps with a portion of the second signal. For each of the plurality of sub-channels, a plurality of symbols are stored in a buffer and a plurality of potential data frames are determined based upon the symbols in the buffer. A signal detection algorithm is applied to the potential data frames to detect the first modulated signal and the second modulated signal. Other implementations of this aspect include corresponding systems, apparatuses, and computer-readable media configured to perform the actions of the method.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

Figure 1:
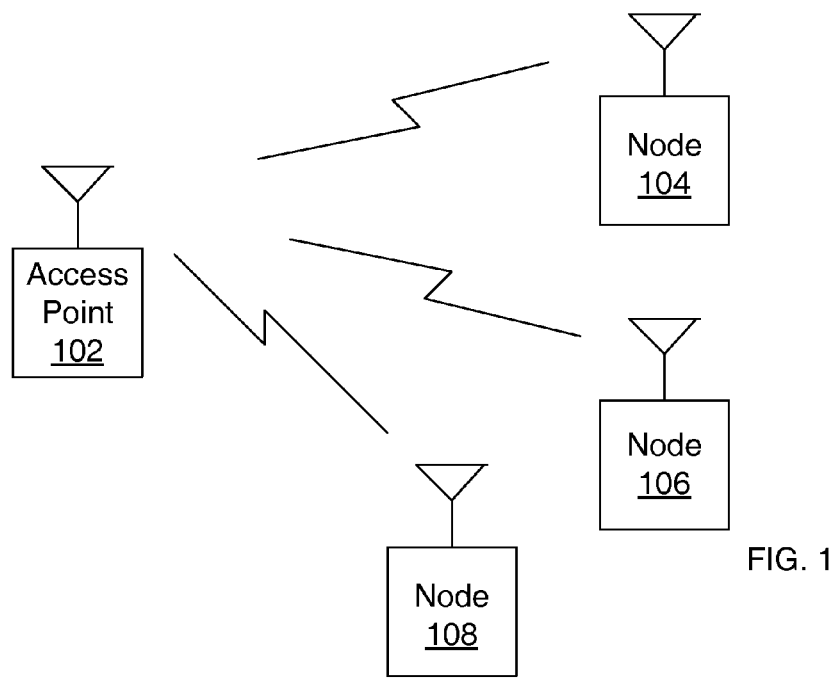
FIG. 1 is an illustration of a simplified network map having an access point and nodes.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Illustrated embodiments are presented within a framework of an Orthogonal Frequency Division Multiplex (OFDM) that is extended to include multiple access. Transmitters can randomly select sub-channels that are orthogonal to one another to transmit upon. A receiver can, therefore, receive data from multiple transmitters at the same time. In addition, the receiver is not required to know which sub-channel a particular transmitter selects. The transmitter can create potential data frames from one or more sub-channels and determine if valid data is contained within each potential data frame.

FIG. 1 is an illustration of a simplified network map 100 having an access point 102 and nodes 104, 106, and 108. The access point 102 and nodes 104, 106, and 108 each contains a transmitter and receiver, not shown, that are operatively coupled to a processor, not shown. Access point 102 communicates with the nodes 104, 106, and 108 using a spread spectrum communication system. Data is transmitted from the access point 102 to any node 104, 106, and/or 108 that is within the transmission range of the access point 102. Nodes 104, 106, and 108 can transmit data to access point 102 such that the data is transmitted simultaneously from nodes 104, 106, and 108. In this case, the transmitted signals overlap with each other in the spectrum. The transmitted data from nodes 104, 106, and 108 can be received and demodulated by access point 102 because the signals are orthogonal to each other. As used herein, a node or tag can refer to any communications device configured to receive signals from and/or send signals to an access point. An access point can refer to any communications device configured to simultaneously communicate with a plurality of nodes or tags. In some implementations, nodes can be mobile, low power devices which run off a battery, a wall outlet, generator, or other stored power source. Access points can also run off a battery, wall outlet, generator, or other stored power source.

In an OFDM system, sub-channels are used. A node can transmit on one or more sub-channels. The sub-channels are orthogonal to one another, such that the receiver can demodulate each sub-channel. In one implementation, each node randomly (which can be pseudo-randomly or randomly) determines a sub-channel upon which to transmit. Each node 104, 106, and 108 randomly determines a sub-channel to transmit data to the access point 102. Collision between two nodes only occurs if two nodes select the same sub-channel. Assuming no collisions, the access point 102 is able to decode the signal from each node 104, 106, and 108.

Figure 2:
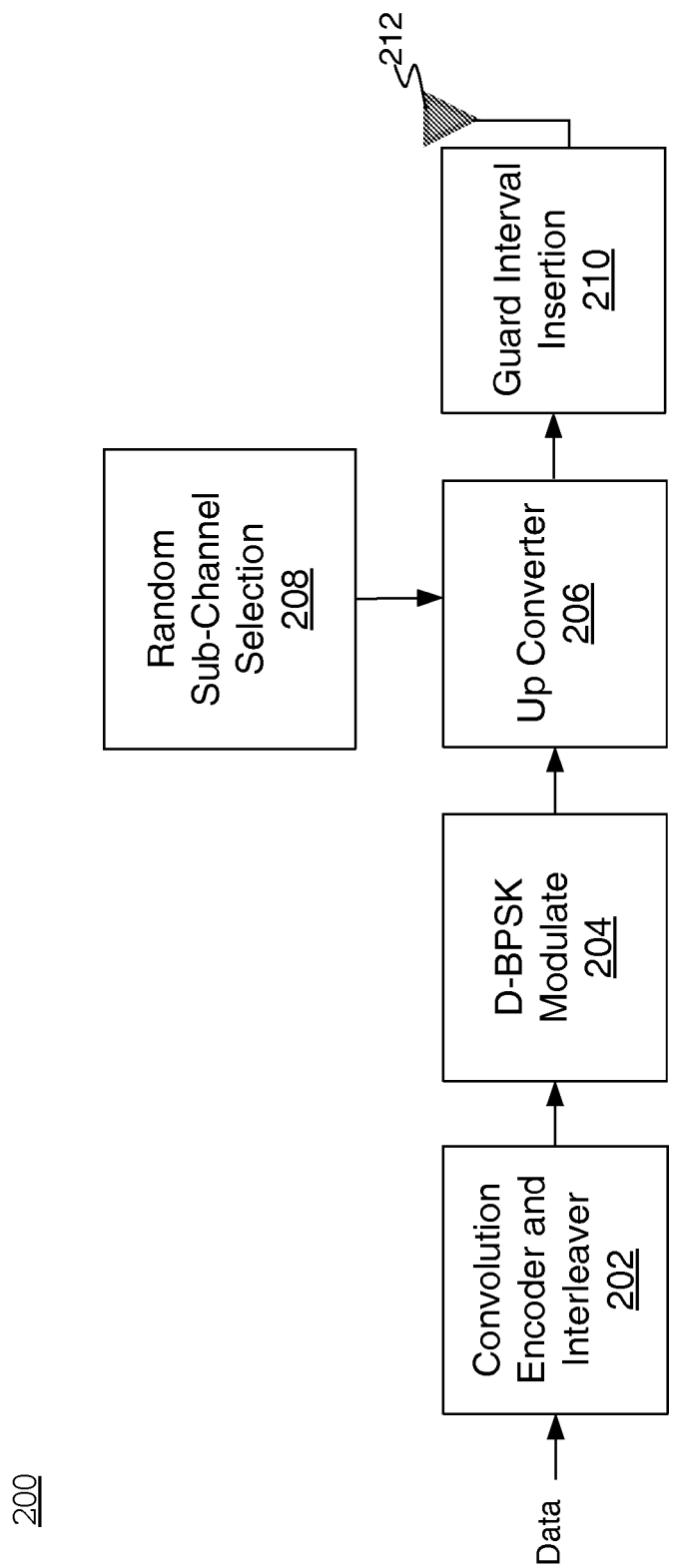
FIG. 2 is a diagram depicting a transmitter in accordance with an illustrative implementation.

FIG. 2 is a diagram depicting a transmitter 200 in accordance with an illustrative implementation. The transmitter 200 includes structures such as a modulator 204, a random sub-channel selector 208, and an up converter 206. The transmitter 200 can be included in a node 104, 106, and/or 108 that communicates with the access point 102. Additional, fewer, or different operations may be performed by the transmitter 200 depending on the particular implementation. The operations may also be performed in a different order than that shown and described.

A data stream is received by a convolution encoder and interleaver 202. The received data stream is encoded using the convolution encoder. In one implementation, the data stream may be encoded at a rate of ½. Alternatively, other rates can be used. The data stream can also be interleaved using the interleaver module. An encoded symbols stream is output to a modulator block 204. In one implementation, the modulator block includes a differential binary phase shift keying (DBPSK) modulator that modulates the encoded symbols stream. Various other modulation schemes are also possible.

Once the symbols are ready for transmission, the symbols are modulated onto a carrier frequency using an antenna 212. To allow for multiple nodes to transmit data simultaneously to an access point, a sub-channel to transmit the symbols can be randomly selected. In one implementation, a random sub-channel selection component 208 determines an OFDM sub-channel upon which to transmit the symbols. This sub-channel can be provided to the up converter 206, which modulates the encoded symbols onto the sub-channel.

The random sub-channel can be selected using any pseudo-random number-generating algorithm or random number. In one implementation, a frequency that a node will transmit on is determined using the formula $e^{j2\pi(RF*\Delta F+CF)}$, wherein RF comprises a random integer, $\Delta F$ comprises a frequency spacing and CF comprises a base carrier frequency. In one implementation, the random sub-channel can be selected using an inverse fast Fourier transform with a single randomly selected bin used and the rest of the bins zeroed out. A modulated signal from the modulator 204 is input into an up convertor component 206 that frequency shifts the signal as needed. The up convertor component 206 is used to ensure that all data transmitted, for example from the node 104, is at a proper frequency such that the signal can be decoded by a receiver, for example a receiver at the access point 104. In one implementation, a node can transmit on one or more sub-channels using OFDM. In this implementation, each of the one or more sub-channels can be randomly selected as described above. In another implantation, one or more nodes transmit on a single sub-channel. In this implementation, the random integer is used to calculate a sub-channel as described above. A guard interval insertion component 210 can insert a guard interval between consecutive symbols to help avoid multipath interference at the receiver. The guard interval can be zero or it can be filled with a cyclic prefix.

Figure 3:
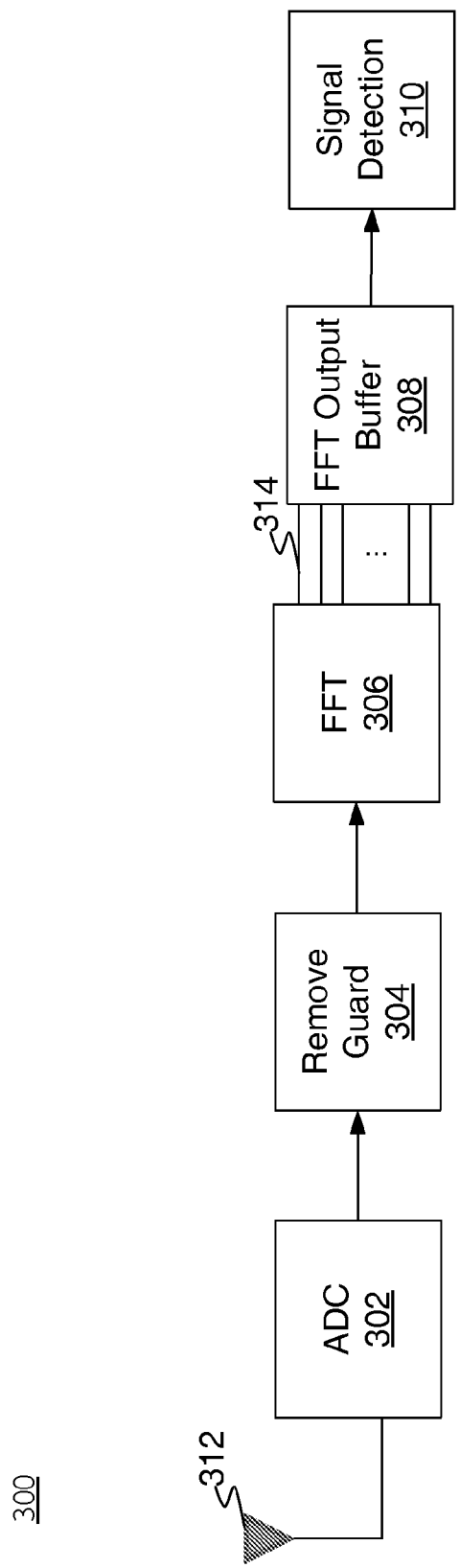
FIG. 3 is a diagram depicting a receiver in accordance with an illustrative implementation.

FIG. 3 is a diagram depicting a receiver 300 in accordance with an illustrative implementation. The receiver 300 includes structures such as an antenna 312, analog-to-digital convertor (ADC) 302, a remove guard band component 304, fast Fourier transform (FFT) component 306, a FFT output buffer 308, and a signal detection component 310. The receiver 300 can be included in the access point 102 and be used to receive data from one or more nodes 104, 106, and/or 108. Additional, fewer, or different operations may be performed by the receiver 300 depending on the particular implementation. The operations may also be performed in a different order than that shown and described.

The receiver 300 can be tuned to a channel on which one or more nodes can transmit, for example a broadcast channel. The ADC 302 converts the received analog signal into its digital counterpart. OFDM uses a guard interval between symbols. Prior to being processed, the guard interval can be removed from the digital data by the remove guard component 304. The data is then provided to an FFT component 306. The FFT component 306 convert the data into the frequency domain. The FFT component 306 can produce a number of parallel streams of data 314, for example n-number of streams. Each stream can be stored in an FFT output buffer 308. For example, each stream can be stored in a data buffer, register, memory, etc. Accordingly, the FFT output buffer 308 can consist of n data buffers, registers, etc. A signal detection component 310 can be used to determine if any of the streams contains a valid frame. In one implementation, the data within the data buffers in assumed to be a frame that includes a hash value. The hash value is calculated based upon one or more elements of the frame. In one implementation, the hash value is a cyclic redundancy check value. The signal detection component 310 can calculate the hash value based upon the same one or more elements of the frame. The calculated hash can be compared to the hash value from the frame. If the hash values match, the signal is deemed detected at that corresponding sub-channel.

Figure 4:
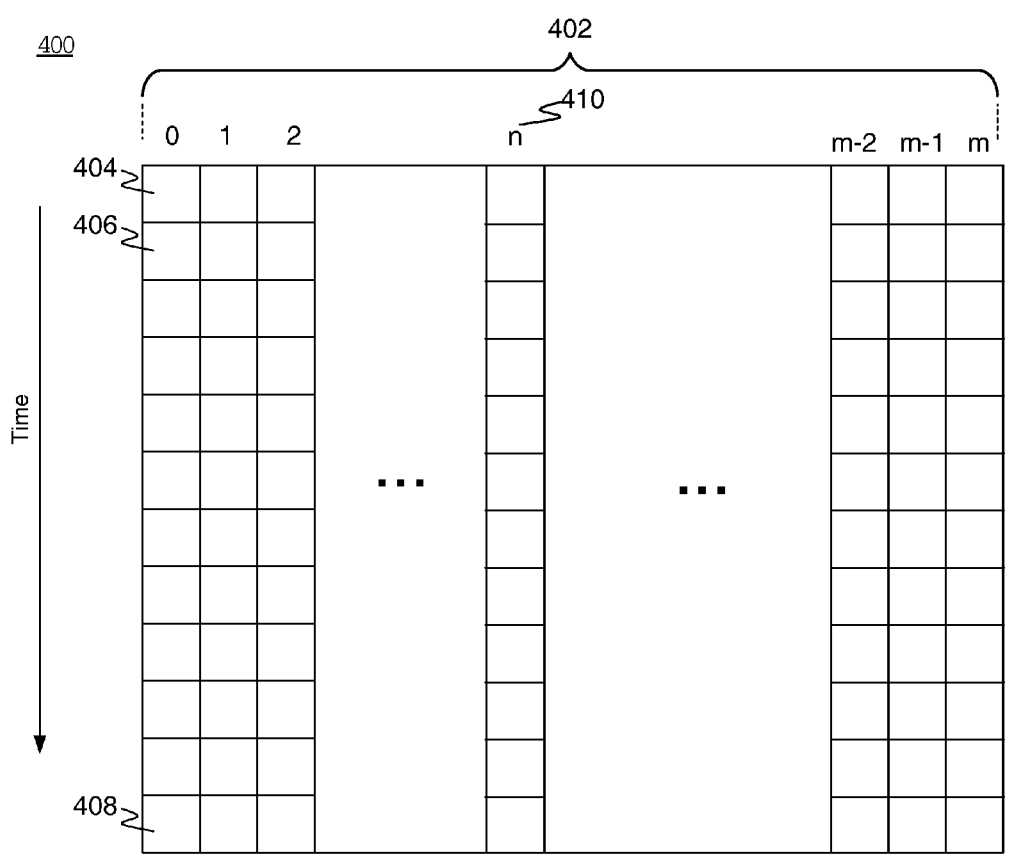
FIG. 4 is a diagram illustrating an FFT output buffer in accordance with an illustrative implementation.

FIG. 4 is a diagram illustrating an FFT output buffer in accordance with an illustrative implementation. To ensure proper detection of a frame, the receiver and the transmitters can be time synchronized. A buffer 400 can include a block of memory organized into an array. Columns 402 correspond to particular sub-channels. The number of sub-channels can vary. Rows of the array correspond to a particular symbol time. For example, row 404 corresponds to the first potential symbol of a frame, row 406 corresponds to the second potential symbol of a frame, and row 408 corresponds to a last potential symbol of a frame. The output from the FFT 306 at a particular symbol time corresponds to a symbol for each sub-channel. As time progresses, the array is filled with data that may correspond to data frames from one or more transmitters. For example, after a period of time has elapsed equal to the length of a data frame, the buffer 400 can contain up to m valid data frames. That is, the buffer 400 can contain a number of valid data frames corresponding to the maximum number of sub-channels.

In one implementation, a node can transmit an entire frame of symbols on a single randomly selected sub-channel. For example, a node can randomly selected sub-channel n. The node will transmit a frame of symbols to an access point on sub-channel n. After the buffer 400 is filled with potential symbols from the FFT 306, column 410 will include the symbols transmitted from the node on sub-channel n. In one implementation, the data frame contained within column 410 contains a previously calculated hash value that is based upon one or more symbols contained within the data frame. For example, the transmitter can determine the hash value and include the hash value in the data frame prior to transmission. The hash value can be recalculated based upon the one or more symbols contained within the data frame and compared to the stored hash value. A match signifies that the data frame is valid and contains data that is to be processed accordingly.

In another implementation, a node can hop to different channels while transmitting a data frame. For example, nodes can use a mapping sequence function with a random number to determine the sub-channels to transmit the data frame's symbols upon. As an example, a node can first determine a random number. Next, the node can add the random number to the output of a known hopping sequence for a first frequency. This result is the first random sub-channel that the node will use. To ensure that a large random number does not cause a sub-channel greater than the number of maximum sub-channels, the random sub-channel can be the result of the random number modulo the maximum number of sub-channels. After a predetermined number of symbols is transmitted, the node can add the random number to the next value of the mapping sequence function to determine the next sub-channel. The selection of hopping continues based upon a predetermined schedule that is known by both the receiver and the transmitters.

Hopping to a different sub-channel can result in a random change in the phase of the data signal. To ensure that the data can be demodulated by schemes such as DBPSK, a symbol describing the phase of the sub-channel can be transmitted after the hop that describes the phase of the sub-channel. Additional symbols following the phase symbol can then be demodulated based upon the phase symbol. As the phase symbol is overhead, to minimize overhead multiple data symbols can be transmitted on a sub-channel before hopping to the next sub-channel. For example, two, three, five, ten, etc. symbols can be transmitted after the phase symbol before hopping to the next channel.

In a sub-channel hopping implementation, the receiver uses the mapping sequence function to create data frames from the buffer 400. Because the data frames are spread across different sub-channels, a single column does not correspond to a single data frame. Instead, the receiver must first reverse the frequency hopping to construct all of the potential data frames. The receiver constructs the potential data frames from the buffer 400 by first calculating the first value of the mapping sequence function. As an example, the first value can be 5. Accordingly, the random value used by a transmitter that started to transmit its data frame on sub-channel 8 is 3. At the predetermined time, the receiver can calculate the next value of the mapping sequence function and add 3, the transmitter's random value, to determine the transmitter's next sub-channel. The receiver can continue to do this based upon the predetermined schedule and construct the data frame from the transmitter.

Figure 5:
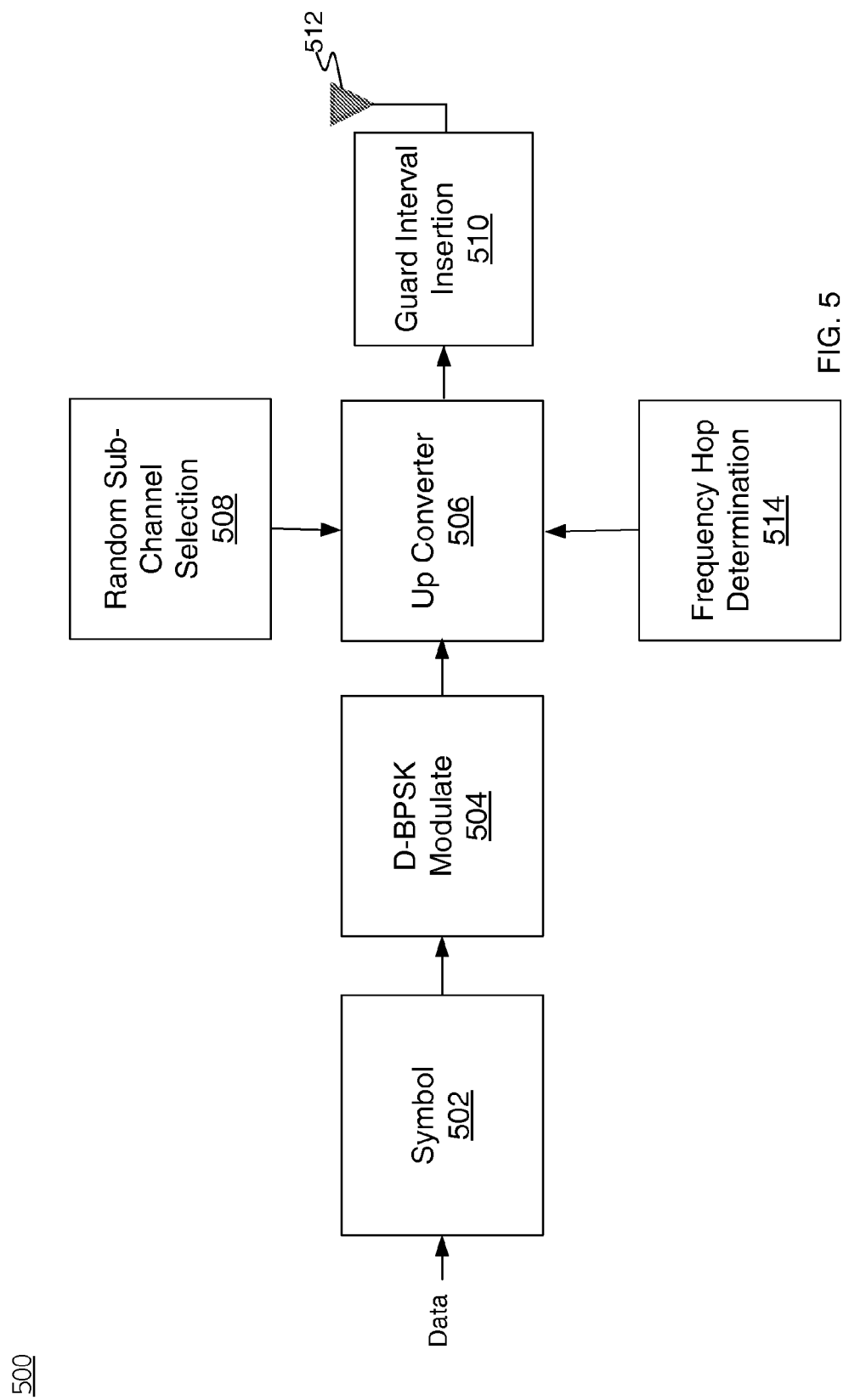
FIG. 5 is a diagram depicting a frequency hop transmitter in accordance with an illustrative implementation.

FIG. 5 is a diagram depicting a frequency hop transmitter in accordance with an illustrative implementation. The transmitter 500 includes components similar to those of transmitter 200. In addition, transmitter 500 includes a frequency hop determination component 514. In one implementation, the frequency hop determination component 514 provides a signal indicating that the next frequency hop should occur.

In one implementation, a node transmits an entire frame on a sub-channel before transmitting a second frame on a potentially different sub-channel. In other words, a randomly-selected sub-channel is kept constant during the transmission of a frame. After the frame has been transmitted the frequency hop determination component 514 can provide a signal indicating that a new sub-channel should be used to transmit a second frame. In another implementation, switching to a new sub-channel can be based upon a timer. The frequency hop determination component 514 can include this timer and provide a signal to use a new sub-channel upon expiration of this timer. In this implementation, a first portion of a frame can be transmitted on a first sub-channel and a second portion of the frame can be transmitted on a second sub-channel.

As some regulations require that a transmitter spread transmission power per unit of time across a frequency spectrum, in one implementation an ordered list of frequencies can be used to determine the next frequency on which to transmit. In this implementation, the random sub-channel is selected from the ordered list of frequencies. The next sub-channel selected will be based upon the ordered list of frequencies.

In addition to time, a detection of a collision can be used to initiate a sub-channel change. For example, in one implementation a node can transmit a frame and wait for an acknowledgment (ACK) from the access point. If the ACK is not received from the access point, the node can assume that a collision has occurred that resulted in the access point not receiving the previously transmitted frame. To avoid future collisions, the node can select another random sub-channel to transmit data. Because the access point is not required to know the sub-channel used by a particular node, the node can switch to a new randomly selected sub-channel at a frame boundary without notifying the access point. In one implementation, the node selects another random sub-channel and then re-transmits the unacknowledged frame. If a collision did occur as a result of another node also transmitting a frame to the access point, this second node would also likely detect a collision based upon its unacknowledged transmitted frame. The second node can also select a new random sub-channel, which likely is not the same as the newly selected sub-channel of the first node, and therefore the first and second node will no longer collide.

Figure 6:
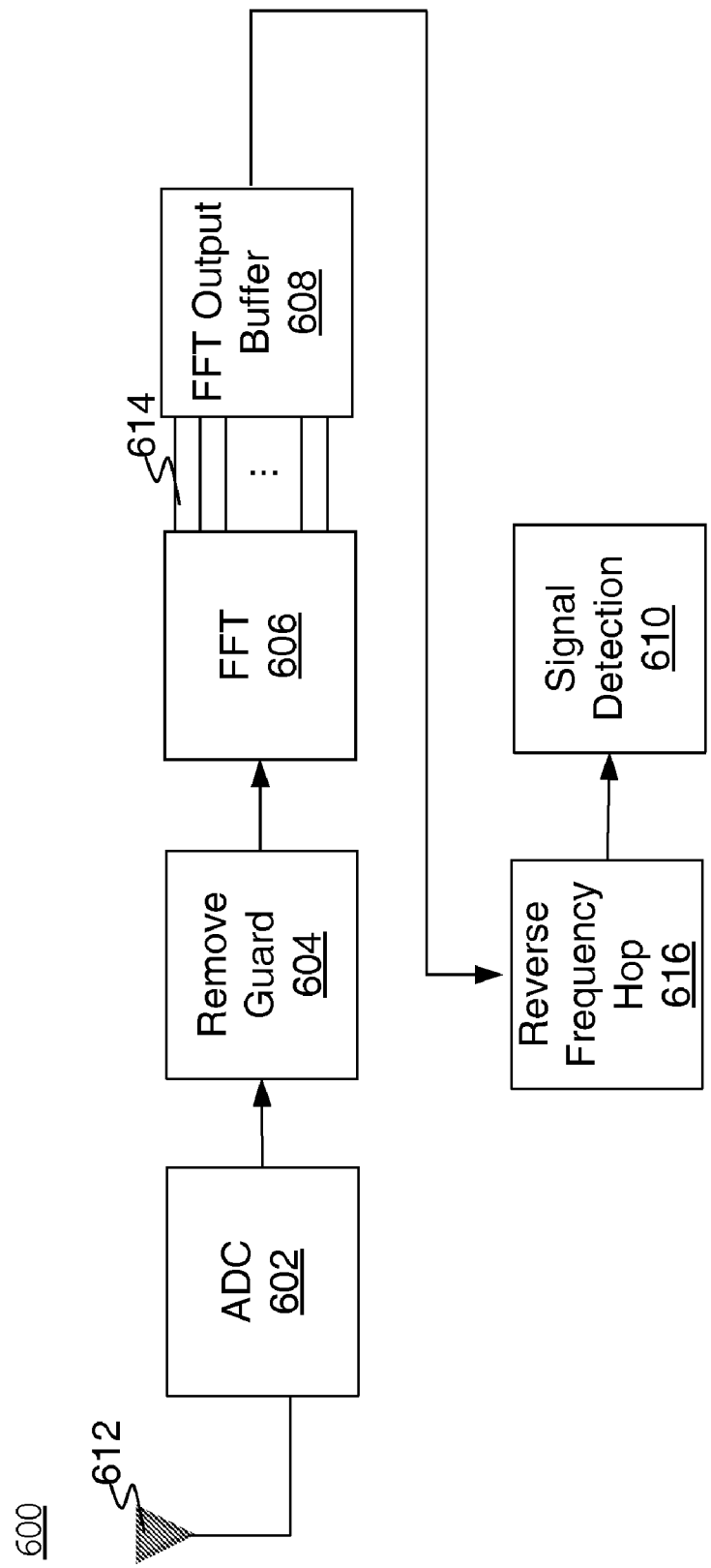
FIG. 6 is a diagram depicting a frequency hop receiver in accordance with an illustrative implementation.

FIG. 6 is a diagram depicting a frequency hop receiver in accordance with an illustrative implementation. The receiver 600 includes components similar to those of receiver 300. In addition, the receiver 600 includes a reverse frequency hop component 614. In one implementation, the reverse frequency hop component 614 ensures that a frame split across multiple sub-channels is properly processed as described above.

In one implementation, data transmitted from the nodes is received at a predetermined power level at the access point. The access point can provide power control information to the node, such that the data transmitted from the nodes is received at a predetermined power level at the access point.

One or more flow diagrams have been used herein. The use of flow diagrams is not meant to be limiting with respect to the order of operations performed. The herein-described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for receiving signals in a multiple access communication system comprising:
   receiving, at a receiver, a first modulated signal on a first sub-channel, wherein a first transmitter randomly selects the first sub-channel from a plurality of sub-channels;
   receiving, at the receiver, a second modulated signal on a second sub-channel, wherein the second sub-channel is orthogonal to the first sub-channel, wherein a second transmitter randomly selects the second sub-channel from the plurality of sub-channels, and wherein at least a portion of the first signal overlaps with a portion of the second signal;
   storing, for each of the plurality of sub-channels, a plurality of potential symbols in a buffer;
   determining a plurality of potential data frames based upon the potential symbols in the buffer; and
   applying a signal detection algorithm to the potential data frames to detect the first modulated signal and the second modulated signal.

2. The method of claim 1, wherein the buffer comprises a plurality of buffers, wherein each buffer corresponds to one sub-channel.

3. The method of claim 1, wherein the first sub-channel is given by the formula $e^{j2\pi(RF^*\Delta F+CF)}$, wherein RF comprises the first random frequency offset, $\Delta F$ comprises a frequency spacing and CF comprises a base carrier frequency.

4. The method of claim 1, wherein the first transmitter transmits a frame of symbols on the first sub-channel.

5. The method of claim 1, wherein each of the potential data frames is spread across multiple sub-channels.

6. The method of claim 5, wherein the first transmitter transmits symbols of a first data frame across multiple sub-channels according to a known hopping sequence.

7. The method of claim 6, wherein the known hopping sequence satisfies a requirement for spreading a transmission power per unit time across a frequency spectrum.

8. The method of claim 1, wherein the signal detection algorithm comprises:
   calculating, for each potential data frame, a hash value on the potential data frames; and
   determining if the hash value matches a previously calculated hash value contained in the potential data frame.

9. The method of claim 8, wherein the hash value is a cyclic redundancy check value.

10. The method of claim 1, wherein the first modulated signal and the second modulated signal are both received at a predetermined power level.

11. An access point comprising:
    a receiver configured to:
       receive a first modulated signal on a first sub-channel, wherein a first transmitter randomly selects the first sub-channel from a plurality of sub-channels; and
       receive a second modulated signal on a second sub-channel, wherein the second sub-channel is orthogonal to the first sub-channel, wherein a second transmitter randomly selects the second sub-channel from the plurality of sub-channels, and wherein at least a portion of the first signal overlaps with a portion of the second signal; and
    a processor operatively coupled to the receiver and configured to:
       store, for each of the plurality of sub-channels, a plurality of potential symbols in a buffer;
       determine a plurality of potential data frames based upon the potential symbols in the buffer; and
       apply a signal detection algorithm to the potential data frames to detect the first modulated signal and the second modulated signal.

12. The access point of claim 11, wherein the buffer comprises a plurality of buffers, wherein each buffer corresponds to one sub-channel.

13. The access point of claim 11, wherein the first frequency is given by the formula $e^{j2\pi(RF^*\Delta F+CF)}$, wherein RF comprises the first pseudo-random frequency offset, $\Delta F$ comprises a frequency spacing and CF comprises a base carrier frequency.

14. The access point of claim 11, wherein the first transmitter transmits a frame of symbols on the first sub-channel.

15. The access point of claim 11, wherein each of the potential data frames is spread across multiple sub-channels.

16. The access point of claim 15, wherein the first transmitter transmits symbols of a first data frame across multiple sub-channels according to a known hopping sequence.

17. The access point of claim 16, wherein the known hopping sequence satisfies a requirement for spreading a transmission power per unit time across a frequency spectrum.

18. The access point of claim 11, wherein the signal detection algorithm comprises:

calculating, for each potential data frame, a hash value on the potential data frames; and determining if the hash value matches a previously calculated hash value contained in the potential data frame.

19. The access point of claim 18, wherein the hash value is a cyclic redundancy check value.

20. The access point of claim 11, wherein the first modulated signal and the second modulated signal are both received at a predetermined power level.

* * * * *